United States Patent [19]

Braun

[11] Patent Number: 4,548,309

[45] Date of Patent: Oct. 22, 1985

[54] CLUTCH PLATE FOR USE IN FRICTION CLUTCHES OF MOTOR VEHICLES AND THE LIKE

[75] Inventor: Helmut Braun, Sinzheim, Fed. Rep. of Germany

[73] Assignee: Luk Lamellen und Kupplungsbau GmbH, Bühl, Fed. Rep. of Germany

[21] Appl. No.: 579,097

[22] Filed: Feb. 10, 1984

Related U.S. Application Data

[63] Continuation-in-part of Ser. No. 561,199, Dec. 14, 1983, abandoned.

[30] Foreign Application Priority Data

Dec. 24, 1982 [DE] Fed. Rep. of Germany ....... 3248119

[51] Int. Cl.[4] .......................... F16D 3/12; F16D 3/14; F16D 3/66
[52] U.S. Cl. .............................. 192/106.2; 192/106.1; 192/70.17; 192/70.18; 464/68; 384/192
[58] Field of Search ............... 192/106.1, 106.2, 70.17, 192/70.18; 464/68; 384/192, 246

[56] References Cited

U.S. PATENT DOCUMENTS

| | | | |
|---|---|---|---|
| 2,775,105 | 12/1956 | Banker | 192/106.1 |
| 4,036,341 | 7/1977 | Beeskow et al. | 192/106.2 |
| 4,395,142 | 7/1983 | Lobeck | 384/192 |
| 4,474,276 | 10/1984 | Loizeau | 192/106.1 |

FOREIGN PATENT DOCUMENTS

| | | | |
|---|---|---|---|
| 691887 | 8/1964 | Canada | 192/106.2 |
| 2814059 | 10/1978 | Fed. Rep. of Germany . | |
| 1317952 | 1/1963 | France | 464/68 |

*Primary Examiner*—Samuel Scott
*Assistant Examiner*—Allen J. Flanigan
*Attorney, Agent, or Firm*—Peter K. Kontler

[57] ABSTRACT

A clutch plate wherein a hub is rotatable within limits and is movable radially within limits relative to two coaxial discs one of which carries the friction linings. Rotation of the hub and discs relative to each other is opposed by one or more coil springs as well as by a friction generating assembly having a first component which is rotatable with the hub and has a first conical surface, and a second component rotatable with the discs and having a second conical surface which is complementary to or exactly congruent with the first conical surface. A diaphragm spring urges the conical surface of one of the components axially toward or directly against the conical surface of other component whereby the two conical surfaces automatically center the discs relative to the hub.

29 Claims, 6 Drawing Figures

Fig.1

CLUTCH PLATE FOR USE IN FRICTION CLUTCHES OF MOTOR VEHICLES AND THE LIKE

CROSS-REFERENCE TO RELATED CASE

This is a continuation-in-part of the copending patent application Ser. No. 561,199 filed Dec. 14, 1983, now abandoned.

BACKGROUND OF THE INVENTION

The present invention relates to clutch plates, especially to clutch plates of the type which can be put to use in friction clutches of motor vehicles, for example, to transmit torque between the flywheel on the crankshaft of an internal combustion engine and the input shaft of a variable-speed transmission. More particularly, the invention relates to improvements in clutch plates of the type wherein a hub (which can be connected with the input shaft of the transmission) is movable angularly (within limits) relative to the carrier or carriers of one or more friction linings (such friction linings serve to receive torque from the aforementioned flywheel if the clutch plate is used in the friction clutch of a motor vehicle).

In clutch plates wherein the hub is turnable within limits relative to the friction linings, angular movements between the two units of the clutch plate are opposed, at least within a portion of the full range of angular movability of the two units with reference to one another, by one or more energy storing devices in the form of coil springs which are installed in registering windows of a flange on the hub and of the carrier or carriers of the friction linings. It is further known to provide friction generating elements which are installed between the two units of the clutch plate to oppose angular movements of the hub relative to the friction linings and/or vice versa. The friction generating elements can oppose each and every angular movement of the two units relative to each other or only certain stages of such angular movement.

German Offenlegungsschrift No. 2,814,059 discloses a bearing ring which is interposed between the hub and the carriers of friction linings in a clutch plate and has a substantially L-shaped cross-sectional outline i.e., the bearing ring includes a radially extending collar and an axially extending sleeve. The bearing ring is non-rotatably affixed to the carriers of friction linings and its sleeve-like portion surrounds the hub to thus ensure that the carriers are centered on the hub. The radially extending collar of the bearing ring is biased against the radially outwardly extending flange of the hub. The biasing action is performed by a spring which reacts against one of the two coaxial spaced-apart disc-shaped carriers of the friction linings. The flange is disposed between the two discs and the spring reacts against that side of the flange which is not contacted by the aforementioned collar of the bearing ring. In this way, the other disc, which is connected to the bearing ring, is urged in a direction to maintain the collar in frictional engagement with the respective side of the flange.

As a rule, the sleeve of the bearing ring surrounds the hub with at least some radial clearance. Such clearance is established as a result of manufacturing tolerances as well as to facilitate assembly of the clutch plate. An undesirable phenomenon which is attributable to the provision of this clearance is that it limits the extent to which the clutch plate can be balanced, i.e., a friction clutch which embodies the clutch plate is likely to create problems (particularly noise and extensive wear) due to the absence of accurate centering of the carriers of friction linings relative to the hub. A problem which is most likely to arise is excessive vibration of the clutch plate which, in turn, brings about excessive wear upon the parts which cooperate with the clutch plate as well as pronounced reduction of comfort to the occupant or occupants of the motor vehicle if the clutch plate forms part of a friction clutch for motor vehicles. Moreover, vibrations cause an increase of the radial clearance between the sleeve of the aforementioned bearing ring and the hub to thus further increase the unbalance to an extent which becomes intolerable and renders it necessary to replace the clutch plate or the entire friction clutch. The wear upon the sleeve of the bearing ring and/or upon the hub of the clutch plate is also attributable to the action of radial forces which develop when the clutch plate is in use; such forces contribute to unbalance with the aforediscussed undesirable consequences.

OBJECTS AND SUMMARY OF THE INVENTION

An object of the invention is to provide a novel and improved clutch plate which is constructed and assembled in such a way that its two units are permanently coaxial with one another.

Another object of the invention is to provide a clutch plate wherein the assembly which generates friction during angular movement of one of the two units relative to the other unit can automatically center the units by maintaining them in positions of accurate axial alignment.

A further object of the invention is to provide a clutch plate wherein the two units remain in exact axial alignment with each other in spite of progressing wear upon their parts.

Still another object of the invention is to provide a clutch plate which can be used in existing friction clutches as a superior substitute for heretofore known clutch plates.

An additional object of the invention is to provide a novel and improved friction generating assembly for use between the two relatively movable units of a clutch plate.

Another object of the invention is to provide the above outlined clutch plate with novel and improved means for preventing progressing wear from causing vibration and/or other stray movements of the units relative to each other and/or relative to other parts of a friction clutch.

An additional object of the invention is to provide a clutch plate which is designed to ensure automatic centering of one of its units relative to the other unit but nevertheless enables a friction clutch to transmit torque between two misaligned rotary elements, such as between the crankshaft of an internal combustion engine and the input shaft of a variable-speed transmission in a motor vehicle.

Another object of the invention is to provide a novel and improved method of automatically centering the unit including the friction linings on the unit including the hub of a clutch plate for use in friction clutches or the like.

An additional object of the invention is to provide a clutch plate which exhibits all or at least some of the above outlined novel and desirable features but is not or need not be bulkier or more expensive than heretofore known clutch plates.

Another object of the invention is to provide a clutch plate wherein the two units remain centered during the entire useful life of the clutch plate.

Still another object of the invention is to provide a novel and improved diaphragm spring for use in a clutch plate of the above outlined character.

A further object of the invention is to provide novel and improved relatively movable units which can be assembled into a clutch plate of the above outlined type.

The invention is embodied in a clutch plate, particularly in a clutch plate which can be used in the friction clutch of a motor vehicle. The improved clutch plate comprises a first rotary unit which includes a hub and a second rotary unit which includes at least one friction lining. The two units are rotatable relative to each other within a predetermined range and the two units are further movable, within limits, radially with reference to each other. The clutch plate further comprises energy storing means (e.g., one or more coil springs) which is interposed between the two units to yieldably oppose their rotation relative to each other, at least within a portion of the aforementioned range, and a combined centering and friction generating assembly which serves to yieldably oppose rotation of the two units relative to each other, at least within a portion of the aforementioned range, and to simultaneously center the two units with reference to each other. The friction generating assembly comprises a first component which is provided on and is rotatable with one of the units and has a substantially conical surface, a second component which is provided on and is rotatable with the other unit and has an at least linear contact with the conical surface, and resilient means (e.g., a diaphragm spring) for biasing the two components against each other. The surface of the first component can have a frustoconical shape, a convex shape, or a concave shape. The second component can have a complementary second substantially conical surface which is or can be congruent with the first surface.

The second unit preferably comprises spaced-apart coaxial first and second discs and the hub preferably includes a flange which is disposed between the two discs. The friction lining or linings are mounted on the first disc, the first component of the friction generating assembly can be provided on the hub, and the second component of the friction generating assembly can be provided on one of the discs. One of the conical surfaces (e.g., substantially frustoconical surfaces) faces toward and the other of these surfaces faces away from the common axis of the two units. The second component can constitute the radially innermost portion of the one disc and the first component can be integral with the hub.

At least one of the two components of the friction generating assembly can comprise or constitute a friction ring, and such friction ring can be mounted for rotation with the hub of the first unit or with the discs of the second unit.

Alternatively, the second component can comprise a substantially ring-shaped member which is rotatable with the second unit and is movable radially of the first unit. The resilient means is then arranged to bias the ring-shaped member radially of the two units so that the ring-shaped member bears against or is urged toward the conical surface of the first component. As mentioned above, the resilient means can comprise a diaphragm spring, and such diaphragm spring can comprise at least one radially outwardly extending first arm and at least one radially inwardly extending second arm. One of the first and second arms is non-rotatably connected with the ring-shaped member and the other of the first and second arms is non-rotatably connected to the second unit whereby the diaphragm spring ensures that the ring-shaped member shares all rotary movements of the second unit.

It is also possible to provide one of the discs which form part of the second unit with at least one socket and to provide the second component with an arm or an analogous projection which is non-rotatably received in the socket. Such socket preferably tapers in the axial direction of the two units. It is also possible to reverse the positions of the socket and arm, i.e., the arm can be provided on one of the discs and the socket is then provided in or on the second component.

At least one of the two components of the friction generating assembly can constitute a slotted friction ring. It is preferred or possible to mount the two components of the friction generating assembly at one side and to mount the resilient means at the other side of the flange which latter may constitute an integral or separable part of the hub. If one of the two components of the friction generating assembly comprises a friction ring, such friction ring can be coaxially mounted on and can be moved axially of the hub; the resilient means then reacts against the flange (i.e., against the hub) to bias the friction ring in the axial direction of the flange. In each of the various embodiments of the invention, the resilient means is preferably arranged to bias one of the two components of the friction generating assembly axially of the two units and toward the other component. The resilient means can comprise the aforementioned diaphragm spring, and such diaphragm spring can be non-rotatably connected to the friction ring which surrounds the hub. The diaphragm spring can be rigid or integral with one of the two components of the friction generating assembly. The conical surface of the one component then constitutes (or can constitute) a convex surface of the diaphragm spring.

The friction generating assembly is preferably designed to yieldably oppose rotation of the two units relative to each other within the entire predetermined range. The arrangement is preferably such that the diaphragm spring biases the discs of the second unit axially of the hub to thereby urge the two components toward each other.

If the first component is provided on the hub, the second component can be provided on one of the discs and the friction generating assembly can further comprise a friction generating washer which is interposed between the two components. Such washer can have a substantially conical surface which abuts against and is congruent with the conical surface of the first component and/or an additional substantially conical surface which abuts against the second component.

The novel features which are considered as characteristic of the invention are set forth in particular in the appended claims. The improved clutch plate itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
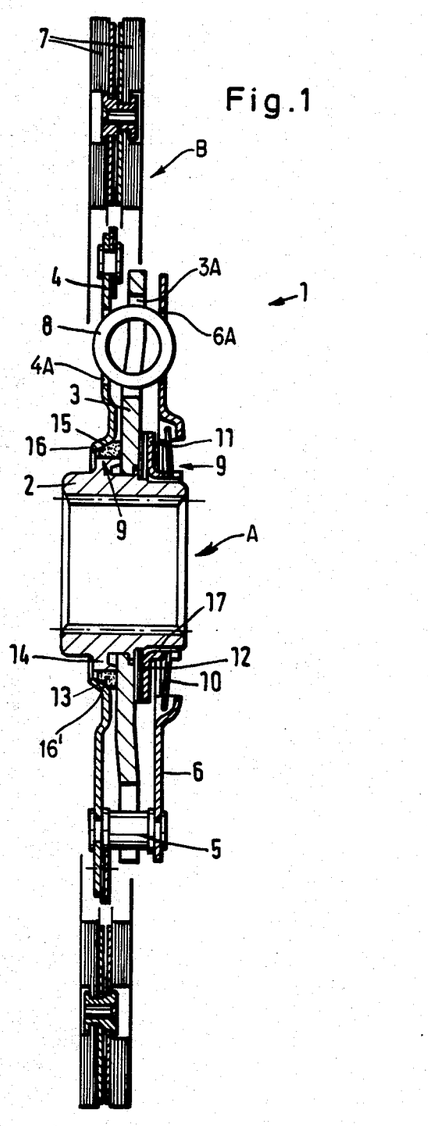
FIG. 1 is an axial sectional view of a clutch plate which embodies one form of the invention and wherein the second component of the friction generating assembly is an integral part of one of the two discs which carry the friction linings.

The clutch plate 1 which is shown in FIG. 1 can be used in the friction clutch of a motor vehicle and comprises two coaxial units A and B. The first unit A comprises a hub 2 which is rigidly connected with a radially outwardly extending flange 3. The latter extends with axial play between two coaxial discs 4 and 6 of the second unit B. The discs 4 and 6 are rigidly connected to each other by a set of rivets 5 or analogous distancing elements, and the disc 4 serves a carrier for two friction linings 7 which are secured thereto by rivets or in any other conventional way. The linings 7 are disposed between two pressure plates when the clutch plate 1 is installed in a friction clutch, and one of the pressure plates is movable axially toward the other pressure plate so that the linings 7 transmit torque between such pressure plates. Reference may be had, for example, to commonly owned U.S. Pat. No. 4,368,810 granted Jan. 18, 1983 to Paul Maucher et al. which discloses a friction clutch adapted to use the improved clutch plate.

The units A and B are rotatable relative to each other about a common axis to a predetermined extent, and at least a portion of such relative angular movement is opposed by one or more energy storing devices in the form of coil springs 8 which are installed in registering windows 4A, 6A of the discs 4, 6 on the one hand and windows 3A of the flange 3 on the other hand. The units A and B are further movable, within limits, radially with reference to each other. The extent of such radial movability is indicated in FIG. 1 by an annular clearance 17 between the hub 2 and the axially extending sleeve-like portion of a pressure transmitting member 11 which constitutes one element of a friction generating assembly 9. The latter performs two functions, namely, of yieldably opposing rotation of the units A and B relative to each other (preferably within the entire range of angular movability of such units relative to one another) and of automatically centering the units A and B so that their axes coincide, even if certain parts of the clutch plate undergo some or even pronounced wear.

The friction generating assembly 9 includes a first component 13 which is a friction ring non-rotatably surrounding a ring-shaped shoulder 14 of the hub 2 and being movable axially of the hub, and a second component 16 which is an integral part and constitutes the radially innermost annular portion of the disc 4. The assembly 9 further comprises resilient means in the form of a diaphragm spring 10 which reacts against the radially innermost portion of the disc 6 and bears against the radially extending portion or collar of the aforementioned pressure transmitting member 11. The innermost portion of the diaphragm spring 10 has an annulus of teeth which mate with an annulus of teeth at the right-hand axial end of the cylindrical or sleeve-like portion of the pressure transmitting member 11.

A portion of the friction ring 13 has a frustoconical peripheral surface 15 which is in direct abutment with a complementary and preferably congruent frustoconical internal surface 16' of the innermost portion of the disc 4. The disc 4 can be formed by stamping, i.e., the portion or component 16 can be made simultaneously with the cutting operation involving removal of the disc 4 from a metallic blank in a stamping or like machine.

The friction generating assembly 9 further comprises a friction generating washer 12 which is interposed between the collar of the pressure transmitting member 11 and the respective side of the flange 3. The diaphragm spring 10 permanently biases the pressure transmitting member 11 against the washer 12 which, in turn, is biased against the flange 3. Thus, the diaphragm spring 10 tends to move the disc 4 axially toward the flange 3 whereby the conical internal surface 16' (which faces toward the axis of the hub 2) bears directly against the conical external surface 15 (which faces away from the axis of the hub 2) so that friction between the surfaces 15 and 16' opposes rotation of the units A and B relative to each other. The disc 4 is permanently urged in a direction toward the flange 3 because the diaphragm spring 10 urges the disc 6 away from the flange 3 and the rivets 5 compel the disc 4 to share all axial (as well as all angular) movements of the disc 6.

The frustoconical surfaces 15 and 16' of the components 13 and 16 of the friction generating assembly 9 cooperate to accurately center the unit B on the unit A. This is due to the fact that the surfaces 15 and 16' are complementary and preferably congruent. The aforementioned annular clearance 17 between the cylindrical sleeve-like portion of the pressure transmitting member 11 of the friction generating assembly 9 and the peripheral surface of the respective portion of the hub 2 ensures that the units A and B are movable relative to each other within limits which are necessary to enable the assembly 9 to perform a highly desirable centering action as well as to compensate for wear upon the surfaces of parts which are adjacent to and are movable relative to each other. Thus, the diaphragm spring 10 can readily compensate for wear upon the complementary or congruent surfaces 15 and 16' so that the units A and B are held against axial as well as radial movement relative to each other as long as the bias of the spring 10 suffices to maintain the surface 16' in contact with the surface 15. It will be readily appreciated that the annular clearance 17 need not be pronounced, as long as it suffices to enable the friction generating assembly to perform (if and when necessary) the aforediscussed desirable centering action.

The friction ring 13 (first component of the friction generating assembly 9) is non-rotatably secured to the hub 2. This is desirable in order to prevent the establishment of a radial clearance between the friction ring 13 and the shoulder or collar 14 of the hub 2. A permanent or more or less permanent connection between the hub 2 and the friction ring 13 can be established by resorting to a suitable adhesive, by making the ring 13 a press fit on the shoulder 14 or in any other suitable way. For example, the friction ring 13 can constitute a split ring which tends to reduce its diameter and has a radially extending slot whose width suffices to ensure that the internal surface of such split ring continues to closely follow the peripheral surface of the shoulder 14 even if one of these surfaces or each of these surfaces undergoes a more or less pronounced wear. It will be appreciated that the frustoconical internal surface 16' of the innermost portion 16 of the disc 4 tends to reduce the diameter of the friction ring 13 (especially if the latter constitutes a split ring) so that the ring 13 invariably tends to surround the shoulder 14 without any play.

The term "substantially frustoconical surfaces" is intended to embrace surfaces which are exactly frustoconical or which can function in the same way as the cooperating complementary or congruent surfaces 15, 16' of the components 13, 16 of the friction generating assembly 9, i.e., which can generate friction when the units A and B are caused to turn relative to each other and which can automatically center the unit B on the unit A under the action of the resilient means including the diaphragm spring 10. For example, one of the surfaces 15, 16' can be slightly concave and the other of these surfaces can be slightly or pronouncedly convex or vice versa. Also, one of the surfaces 15, 16' can be a truly frustoconical surface whereas the other of the two surfaces is slightly or even pronouncedly convex. The common axis of such surfaces coincides with the common axis of the units A and B when the unit B is properly centered on the unit A.

An important advantage of the improved clutch plate is that the friction generating assembly 9 is capable of automatically centering the unit B on the unit A as well as of automatically compensating for wear upon the surfaces 15, 16' and/or upon the surfaces of the friction generating washer 12 and those surfaces of the flange 3 and pressure transmitting member 11 which are in contact with the washer 12. All that is necessary is to install the diaphragm spring 10 or equivalent resilient means under a sufficient initial stress so that the resilient means continues to urge the surface 16' against the surface 15 even if these surfaces (and/or the aforementioned surfaces of the washer 12, flange 3 and/or member 11) undergo pronounced wear.

The exact manner in which the components 13, 16 of the friction generating assembly 9 are caused to share the angular movements of the respective units A and B can be selected practically at will. Thus, and as shown in connection with the component 16, one of the two components can constitute an integral part of an element or member of the respective unit. Alternatively, and as shown in connection with the friction ring 13, one of the components can constitute a separately manufactured part which is non-rotatably secured to the respective unit, for example, by resorting to a form-locking connection (e.g., tongue and groove, splines or the like), by resorting to an adhesive, by relying on pronounced friction and/or in any other suitable way.

The extent to which the surface 16' of the component 16 conforms to the surface 15 of the component 13 depends on a number of parameters and can be varied within a wide range. As mentioned above, one of these surfaces can constitute a truly frustoconical surface and the other surface may constitute a convex surface which is in mere linear contact with the truly frustoconical surface. The extent of contact can vary from linear to full surface-to-surface contact (i.e., exact congruity). This will depend on the accuracy of machining, on the hardness of the materials of the components of the friction generating assembly, on the desired friction between the cooperating surfaces and/or on other parameters. It will be readily appreciated that the wear upon congruent surfaces is less pronounced and/or more uniformly distributed than the wear upon surfaces which are in mere or substantial linear contact with one another.

While the frustoconical surface 15 of the friction ring 13 faces outwardly and away from the axis of the hub 2 and the frustoconical surface 16' of the innermost portion 16 of the disc 4 faces toward such axis, the orientation of such surfaces can be reversed by a suitable reshaping of the hub 2 and disc 4. The illustrated orientation is preferred at this time because the hub 2 and the disc 4 can be manufactured at a lower cost. The provision of one of the components 13, 16 directly on one of the discs 4, 6 (i.e., as an integral part of one of the discs) also contributes to lower cost of the clutch plate, not only as concerns the initial cost but also as regards the cost of assembly. An advantage of the friction ring 13 is that it can be mass-produced in readily available machines or that it can be obtained by a reshaping of existing friction rings (i.e., by converting a portion of or the entire cylindrical peripheral surface of a conventional friction ring into a frustoconical surface).

Figure 2:
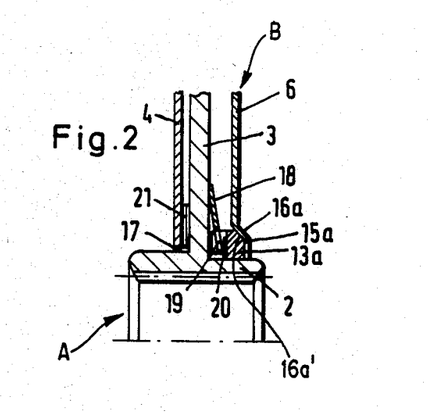
FIG. 2 is a fragmentary axial section view of a modified clutch plate wherein the second component is an integral part of the other disc.

FIG. 2 shows a portion of a modified clutch plate wherein the hub 2 of the first unit A is integral with the flange 3. This flange is disposed in the space between the two discs 4, 6 of the second unit B. The manner in which the discs 4, 6 are rigidly connected to each other is preferably the same as described in connection with FIG. 1. The same applies for the energy storing means (such as one or more coil springs) which yieldably opposes rotation of the units A and B with reference to each other.

The clutch plate of FIG. 2 comprises a modified friction generating assembly wherein the first component is a friction ring 13a surrounding the hub 2 between the flange 3 and the disc 6, and the second component is a portion 16a of the disc 6. The frustoconical peripheral surface 15a of the friction disc 13a is caused to bear against the complementary or congruent frustoconical internal surface 16a' of the component 16a by a diaphragm spring 18 whose radially outermost portion reacts against the flange 3 and whose radially innermost portion bears against the friction disc 13a. It is preferred to ensure that the friction disc 13a cannot rotate relative to the diaphragm spring 18 and/or vice versa; to this end, the left-hand side of the friction disc 13a is formed with an annulus of recesses or tooth spaces 20 for radially inwardly extending projections (e.g., teeth) 19 of the diaphragm spring 18. The friction ring 13a can constitute a split ring so that its internal surface is permanently biased against the adjacent portion of the peripheral surface of the hub 2 because the internal frustoconical surface 16a' bears against the external frustoconical surface 15a, i.e., the portion 16a of the disc 6 tends to reduce the diameter of the friction ring 13a. The recesses 20 and projections 19 ensure that the friction ring 13a cannot rotate with reference to the hub 2 even if the radial component of the force which is furnished by the portion 16a of the disc 6 does not suffice to prevent angular movements of the parts 2 and 13a relative to each other because the diaphragm spring 18 cannot rotate relative to the friction ring 13a and the left-hand side of the diaphragm spring is in pronounced (large-area) surface-to-surface contact with the right-hand side of the flange 3 which latter is integral with the hub 2.

A friction generating washer 21 of the friction generating assembly is installed between the flange 3 and the disc 4.

The diaphragm spring 18 urges the surface 15a of the friction ring 13a against the surface 16a' of the frustoconical portion of the disc 6, i.e., the disc 6 tends to move axially of and away from the flange 3, whereby the disc 4 is caused to bear against the washer 21 and to urge the latter against the left-hand side of the flange 3. Thus, the friction generating assembly of FIG. 2 also opposes rotation of the units A and B relative to each other. At the same time, the frustoconical surfaces 15a and 16a' cooperate to center the unit B on the unit A. The annular clearance 17 between the units A and B ensures that the unit B can be moved radially of the unit A (and/or vice versa) if such radial movement is necessary in order to ensure that the axis of rotation of the unit B will coincide exactly with that of the unit A.

As mentioned above, the friction ring 13a (which constitutes the first component of the friction generating assembly of FIG. 2) should not rotate relative to the hub 2 and flange 3 of the first unit A. This is accomplished in the aforementioned ways, namely, because the second component (innermost portion 16a of the disc 6) of the friction generating assembly tends to reduce the diameter of the friction ring 13a as well as because the friction ring 13a is non-rotatably connected with the diaphragm spring 18 which latter is in pronounced surface-to-surface contact with the flange. In addition, friction between the parts 3, 18 plus the friction between the parts 2 and 13a is greater than friction between the surfaces 15a and 16a. This also ensures that the friction ring 13a does not rotate relative to the hub 2 instead of the component 16a rotating relative to the friction ring 13a and/or vice versa.

Figure 3:
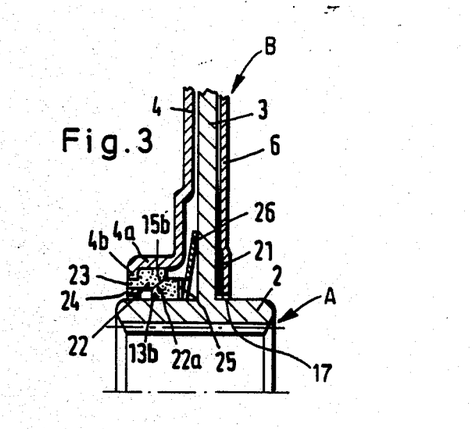
FIG. 3 is a fragmentary axial sectional view of a third clutch plate wherein each component of the friction generating assembly constitutes a friction ring.

FIG. 3 illustrates a third clutch plate wherein the flange 3 of the first unit A is again integral with the hub 2. The second unit B comprises two coaxial discs 4 and 6 which are rigidly connected to each other by rivets or by other suitable distancing elements so that they provide room for the installation of the flange 3 and of the component parts of a modified friction generating assembly therebetween. The first component of this friction generating assembly is a first friction disc 13b which non-rotatably surrounds the hub 2, and the second component of the friction generating assembly includes a second friction disc 22 which is nonrotatably secured to the radially innermost portion 4b of the disc 4. The portion 4b is a collar which extends radially inwardly from an axially extending sleeve-like cylindrical portion 4a which cooperates with the portion 4b and flange 3 to define a ring-shaped shaped chamber for the majority of elements of the friction generating assembly. Such elements further include a friction generating washer 21 between the flange 3 and the right-hand disc 6 as well as a diaphragm spring 26 whose radially outermost portion reacts against the flange 3 and whose radially innermost portion bears against the friction ring 13b. The latter has a frustoconical external or peripheral surface 15b which is complementary to or congruent with the frustoconical internal surface 22a of the friction ring 22. The right-hand side of of the friction ring 13b is adjacent to a friction generating washer 25 which is acted upon by the radially innermost portion of the diaphragm spring 26 so that the latter is highly unlikely to rotate relative to the friction ring 13b. The friction ring 13b can constitute a split ring to further reduce the likelihood of rotation on the hub 2 due to the pressure which is applied by the surface 22a tending to reduce the diameter of the ring 13b.

The friction ring 22 is held against rotation with reference to the disc 4 in that it comprises an annulus of axially extending projections 23 in the form of teeth or the like which are received in slots or tooth spaces 24 provided therefor in the collar 4b of the disc 4. The annular clearance between the units A and B which is necessary in order to enable the friction generating assembly to perform a desirable centering action is shown at 17.

The diaphragm spring 26 biases the friction ring 13b axially of the hub 2 so that the frustoconical surface 15b of the friction ring 13b bears against the frustoconical surface 22a of the friction ring 22. At the same time, the diaphragm spring 26 urges the disc 6 against the washer 21 which latter is caused to bear against the flange 3. The frustoconical surfaces 15b and 22a perform a highly desirable centering action, i.e., they ensure that the axis of the unit B coincides with that of the unit A. The diaphragm spring 26 further compensates for eventual wear upon the complementary or congruent surfaces 15b, 22a and/or for wear upon the surfaces of the washer 21 and the surfaces which are in contact with this washer.

The material of the friction ring 13b may but need not be identical with that of the friction ring 22, 13a and/or 13. Suitable materials for such friction rings are well known in the art.

Figure 4:
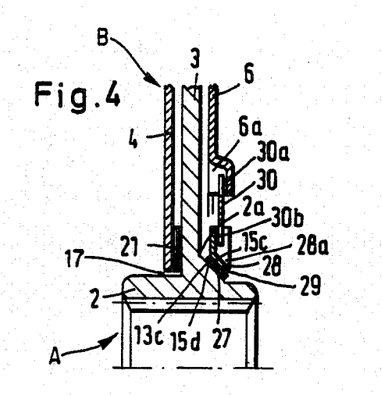
FIG. 4 is a fragmentary axial sectional view of a fourth clutch plate wherein the first component of the friction generating assembly is or can be an integral part of the hub of the first unit.

Referring to FIG. 4, there is shown a fourth clutch plate wherein the flange 3 is integral with the hub 2 of the first unit A. The discs 4, 6 of the second unit B flank the flange 3 and are spaced apart therefrom, as considered in the axial direction of the clutch plate. The first component of the friction generating assembly is a friction ring 13c having a peripheral frustoconical surface 15c and an internal frustoconical surface 15d engaging a complementary conical surface 2a of the hub 2. The second component of the friction generating assembly is a ring-shaped member 28 which is carried by the disc 6. The member 28 is coaxial with and shares the angular movements of the unit B, i.e., of the discs 4 and 6 which are held apart by distancing members not specifically shown in FIG. 4. The frustoconical internal surface 27 of the member 28 is actually defined by a ring-shaped lining 29 which is glued or otherwise affixed to the member 28.

The means for non-rotatably connecting the ring-shaped member 28 to, as well as for centering the member 28 on, the disc 6 includes a diaphragm spring 30 which has radially outwardly extending projections in the form of arms 30a and radially inwardly extending projections in the form of arms 30b. The arms 30a engage the radially innermost portion of the disc 6, and the arms 30b engage the ring-shaped member 28. To this end, the innermost portion of the disc 6 has profiled portions in the form of sockets 6a for the arms 30a, and the member 28 has profiled portions or sockets 28a for the arms 30b. The sockets 6a and 28a taper, wedge-like, in the axial direction of the clutch plate. The diaphragm spring 30 reacts against the sockets 6a and tends to push the member 28 radially inwardly through the medium of its arms 30b whereby the frustoconical surface 27 bears against the complementary frustoconical surface 15c of the friction ring 13c.

In the embodiment of FIG. 4, the conicity of the surfaces 27, 15c, 15d and 2a is the same. However, it is often preferred to select the conicity of the surfaces 2a and 15d in such a way that it is less pronounced than that of the surfaces 15c and 27; this ensures that the surfaces 2a and 15d furnish a self-locking action which greatly reduces the likelihood of rotation of the friction ring 13c on the hub 2. In other words, the steeper surfaces 15c, 27 will slide relative to each other when the units A and B are caused to turn with reference to one another but the friction ring 13c will not rotate on the hub 2.

The radially inwardly acting diaphragm spring 30 causes the friction generating washer 21 between the disc 4 and the flange 3 to bear against the flange because the disc 6 tends to pull the disc 4 in a direction to the right, as viewed in FIG. 4. The annular clearance between the units A and B is shown at 17.

That portion of the hub 2 which is provided with the frustoconical surface 2a can be said to constitute the first component of the friction generating assembly, and the member 28 is the second component of such assembly The part 13c then constitutes a friction generating washer having a first frustoconical surface 15d which is congruent with the surface 2a and a second frustoconical surface 15c which is congruent with the surface 27.

The sockets 6a and 28a can constitute separately machined parts which are welded or otherwise fixedly secured to the disc 6 and ring-shaped member 28. The making of such sockets during stamping of the disc 6 and during the making of the ring-shaped member 28 contributes to lower cost of the clutch plate. The diaphragm spring 30 is capable of yielding in the axial direction of the units A and B. Its arms 30a and 30b are preferably designed in such a way that they can be fitted into the respective sockets 6a and 28a without any play so that the ring-shaped member 28 invariably shares all angular movements of the unit B.

Figure 5:
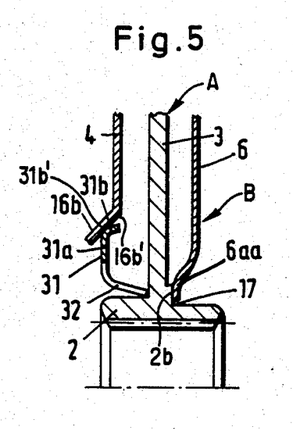
FIG. 5 is a fragmentary axial sectional view of a fifth clutch plate wherein one component of the friction generating assembly is integral with the resilient means.

FIG. 5 shows a modified clutch plate wherein the hub 2 of the first unit A has an integral flange 3. The second unit B includes the discs 4 and 6. The friction generating assembly comprises a first component 31b which rotates with the hub 2 and a second component 16b which is an integral part of the disc 4. The component 31b is integral with the web 31a of a diaphragm spring 31 having radially inwardly extending fingers or prongs 32 which engage the adjacent portion of the hub 2 at the junction of this hub with the flange 3 and thus ensure that the diaphragm spring 31 rotates with the unit A. The tips of the prongs 32 can actually penetrate into the material of the hub 2. The manner in which the discs 4 and 6 of the unit B are non-rotatably connected to each other by distancing elements is not shown in FIG. 5. The component 31b has a substantially frustoconical (preferably at least slightly convex) external surface 31b' which is engaged by a complementary frustoconical surface 16b' of the component 16b.

The mounting of the diaphragm spring 31 is such that it can yield in the axial as well as in the radial direction of the hub 2. Radial deformability of this diaphragm spring is attributable primarily to the provision of prongs 32.

The radially innermost portion 6aa of the disc 6 is cupped and its edge face bears (with annular clearance 17) against the adjacent shoulder 2b of the hub 2 radially inwardly of the innermost portion of the flange 3. The cupped end portion 6aa is in frictional engagement with the shoulder 2b. Friction between the shoulder 2b and the portion 6aa of the disc 6 is attributable to the axial bias of the diaphragm spring 31 which tends to move the disc 4 in a direction to the left, as viewed in FIG. 5.

The cooperating surfaces 31b' and 16b' furnish a highly desirable centering action to thus ensure that the axis of the unit B coincides with that of the unit A. Furthermore, the surfaces 31b', and 16b' oppose rotation of the unit B relative to the unit A and/or vice versa. The annular clearance 17 suffices to enable the surfaces 16b' and 31b' to perform their centering action.

When the units A and B are caused to turn relative to each other, the surface 16b' moves relative to the surface 31b' and/or vice versa, and the surface of the cupped inner end poriton 6aa of the disc 6 slides along the shoulder 2b and/or vice versa. Thus, the components 16b, 31b are in direct metal-to-metal contact with one another, and the same applies for the parts 2 and 6aa. Such construction of the clutch plate is simple and inexpensive because there is no need for the provision of discrete friction rings. As mentioned above, the diaphragm spring 31 is held against rotation relative to the component A by its prongs 32 which penetrate or tend to penetrate into the material of the hub 2 and/or flange 3.

The clutch plate of FIG. 5 further exhibits the advantage that, in view of the ability of the diaphragm spring 31 to yield in the radial direction of the units A and B (and more specifically in view of radial deformability of the prongs 32), the clutch plate can compensate for eventual absence of exact axial alignment between a first shaft (e.g., the input shaft of a variable-speed transmission in a motor vehicle) which is surrounded by the hub 2 and a second shaft (e.g., the crankshaft of an internal combustion engine) which is connected to the unit B when the friction clutch including the clutch plate of FIG. 5 is engaged. Such compensation for eventual lack of axial alignment between the two shafts takes place (when the clutch including the clutch plate of FIG. 5 is engaged) in that successive prongs 32 of the diaphragm spring 31 yield radially when the clutch plate is called upon to transmit torque between the crankshaft of the engine and the input shaft of the transmission. The extent of radial deformation of successive prongs 32 is a function of the extent of misalignment of the axes of the two shafts. The diaphragm spring 31 is again free to accurately center the unit B on the unit A and/or vice versa as soon as the friction clutch is disengaged, i.e., as soon as the friction linings which are carried by the disc 4 cease to transmit torque between the crankshaft (e.g., a flywheel on the crankshaft) and the hub 2 (and hence the input shaft which extends into the hub). Radial yieldability of the prongs 32 prevents the transmission of undesirable centrifugal forces to the input shaft of the transmission if such input shaft is not exactly coaxial with the crankshaft of the engine.

The clutch plate of FIG. 5 can be modified in a number of ways without departing from the spirit of the invention. For example, the component 31b can be modified so that it is provided with a pronounced ring-shaped edge which replaces the frustoconical external surface 31b' and is in mere or more or less linear contact with the conical internal surface of the component 16b. The components 16b, 31b can be made of steel and are automatically centered under the action of the spring 31 to thereby remain in positions of exact coaxiality with one another. Alternatively, the radius of curvature of the surface 31b' can be so small that this surface, too, is in a mere linear contact with the conical surface of the component 16b. If there is some or even pronounced wear upon the component 16b and/or 31b, the initial linear contact is converted into a surface-to-surface contact. A mere linear contact between the two components can be established in other embodiments of the improved clutch plate with equal or similar advantage.

Figure 6:
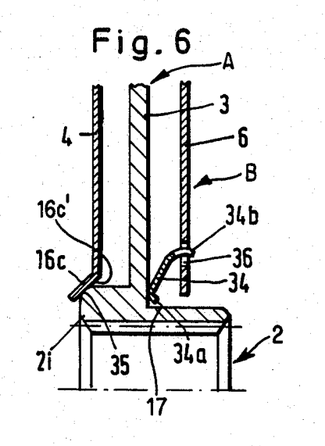
FIG. 6 is a fragmentary axial sectional view of a sixth clutch plate wherein the first component of the friction generating assembly is an integral part of the hub and the second component of the friction generating assembly is integral with one of the discs forming part of the second unit.

FIG. 6 shows a portion of a sixth clutch plate wherein the first unit A comprises a hub 2 and a flange 3 which is integral with the hub. The second unit B comprises the discs 4 and 6. The first component of the friction generating assembly is an integral portion 2i of the hub 2 which has a substantially frustoconical (convex) surface 35 in engagement with the frustoconical internal surface 16c' of the suitably configurated radially innermost portion 16c of the disc 4. The portion 16c constitutes the second component of the friction generating assembly. The diaphragm spring 34 of such assembly has a rounded innermost portion 34a which is in frictional engagement with the respective side of the flange 3 and a radially outermost portion provided with substantially axially extending arms or prongs 34b received in the adjacent slots 36 of the disc 6. The diaphragm spring 34 is installed in prestressed condition so that it urges the disc 4 in a direction to the right, as viewed in FIG. 6, i.e., the surface 16c' bears against the surface 35 to produce therewith a desirable centering action while simultaneously yieldably opposing rotation of the units A and B relative to each other. The prongs 34b ensure that the diaphragm spring 34 cannot rotate with reference to the unit B. The parts 34a and 3 are in direct metal-to-metal contact with one another, the same as the components 2i and 16c. The annular clearance is shown at 17; this clearance suffices to allow for centering of the unit B on the unit A.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate, particularly for use in the friction clutches of motor vehicles, comprising a first rotary unit including a hub; a second rotary unit including at least one friction lining, said units being rotatable relative to each other within a predetermined range and said units being further movable within limits radially with reference to one another; energy storing means interposed between said units to yieldably oppose their rotation relative to each other, at least within a portion of said range; and a combined centering and friction generating assembly arranged to yieldably oppose rotation of said units relative to each other, at least within a portion of said range, and to simultaneously center said units with reference to each other, comprising a first component provided on and rotatable with said first unit in immediate proximity of said hub and having a substantially conical surface, a second component provided on and rotatable with said second unit and having an at least linear contact with said conical surface, and resilient means for biasing said components toward each other.

2. The clutch plate of claim 1, wherein said surface is a frustoconical surface.

3. The clutch plate of claim 1, wherein said surface is a concave surface.

4. The clutch plate of claim 1, wherein said surface is a convex surface.

5. The clutch plate of claim 1, wherein said second component has a second substantially conical surface which is in contact and congruent with the conical surface of said first component.

6. The clutch plate of claim 1, wherein said second component has a second substantially conical surface in contact with the conical surface of said first component, one of said surfaces facing toward and the other of said surfaces facing away from the common axis of said units.

7. The clutch plate of claim 1, wherein said second unit comprises spaced-apart coaxial first and second discs and said hub includes a flange disposed between said discs, said lining being mounted on said first disc, said first component being provided on said hub and said second component being provided on one of said discs.

8. The clutch plate of claim 7, wherein said one disc has a radially innermost portion which constitutes or includes said second component.

9. The clutch plate of claim 7, wherein said first component is integral with said hub.

10. The clutch plate of claim 1, wherein at least one of said components comprises a friction ring.

11. The clutch plate of claim 10, wherein said friction ring is rotatable with said hub.

12. The clutch plate of claim 10, wherein said friction ring is rotatable with said second unit.

13. The clutch plate of claim 1, wherein said second component comprises a ring-shaped member which is rotatable with said second unit and is movable radially of said first unit, said ring-shaped member having a substantially conical surface contacting the conical surface of said first component and said resilient means comprising a spring arranged to bias said ring-shaped member radially of said units so that the conical surface of said member bears against the conical surface of said first component.

14. The clutch plate of claim 13, wherein said spring is a diaphragm spring.

15. The clutch plate of claim 14, wherein said diaphragm spring comprises at least one radially outwardly extending first arm and at least one radially inwardly extending second arm, one of said first and second arms being non-rotatably connected to said ring-shaped member and the other of said first and second arms being non-rotatably connected to said second unit.

16. The clutch plate of claim 1, wherein said second unit comprises at least one disc having at least one socket tapering in the axial direction of said units, said second component having an arm non-rotatably extending into said socket.

17. The clutch plate of claim 1, wherein said second unit includes at least one disc, one of the parts including said disc and said resilient means having an axially extending tapering socket and the other of such parts having an arm non-rotatably received in said socket.

18. The clutch plate of claim 1, wherein at least one of said components includes a slotted friction ring.

19. The clutch plate of claim 1, wherein said hub comprises a radially outwardly extending flange and said components are disposed at one side of said flange, said resilient means being disposed at the other side of said flange.

20. The clutch plate of claim 1, wherein said hub comprises a radially outwardly extending flange and one of said components comprises a friction ring coaxial with and axially movably surrounding said hub, said resilient means comprising a spring reacting against said flange and arranged to bias said friction ring in the axial direction of said flange.

21. The clutch plate of claim 1, wherein said resilient means includes a diaphragm spring arranged to bias one of said components in the axial direction of said hub.

22. The clutch plate of claim 21, wherein at least one of said components comprises a friction ring surrounding said hub and said diaphragm spring is non-rotatably connected with said friction ring.

23. The clutch plate of claim 1, wherein one of said components is rigid with said resilient means.

24. The clutch plate of claim 23, wherein said one component is integral with said resilient means.

25. The clutch plate of claim 1, wherein said friction generating assembly is arranged to yieldably oppose rotation of said units relative to each other within said entire predetermined range.

26. The clutch plate of claim 1, wherein said second unit comprises at least one disc and said resilient means comprises at least one spring arranged to bias said disc axially of said hub and to thereby urge said components toward or against each other.

27. The clutch plate of claim 1, wherein said second unit comprises at least one disc and said first component is provided on said hub, said second component being provided on said disc and further comprising a friction generating washer interposed between said first and second components.

28. The clutch plate of claim 27, wherein said washer has a surface which is congruent with and abuts against said conical surface.

29. The clutch plate of claim 28, wherein said second component has a second substantially conical surface in contact with the conical surface of said first component and said washer has an additional surface which is congruent with said second conical surface.

* * * * *